United States Patent [19]

Nakashima et al.

[11] Patent Number: 4,706,003
[45] Date of Patent: Nov. 10, 1987

[54] ACCELERATION AND DECELERATION CONTROL SYSTEM

[75] Inventors: Seiichiro Nakashima; Kenichi Toyoda, both of Hino; Shinsuke Sakakibara, Komae, all of Japan

[73] Assignee: Fanuc Ltd., Minamitsuru, Japan

[21] Appl. No.: 843,694

[22] PCT Filed: Jul. 4, 1985

[86] PCT No.: PCT/JP85/00377

§ 371 Date: Mar. 4, 1986

§ 102(e) Date: Mar. 4, 1986

[87] PCT Pub. No.: WO86/00730

PCT Pub. Date: Jan. 30, 1986

[30] Foreign Application Priority Data

Jul. 4, 1984 [JP] Japan .................. 59-138270

[51] Int. Cl.[4] .......................... G05B 19/42
[52] U.S. Cl. ....................... 318/568; 318/636; 318/615
[58] Field of Search ............ 318/568, 636, 615

[56] References Cited

U.S. PATENT DOCUMENTS 4,554,497 11/1985 Nozawa et al. ............. 318/636
4,603,286 7/1986 Sakamo ..................... 318/615

Primary Examiner—William M. Shoop, Jr.
Assistant Examiner—Saul M. Bergmann
Attorney, Agent, or Firm—Staas & Halsey

[57] ABSTRACT

An acceleration and deceleration system smoothly controls acceleration and deceleration of an electric motor for driving a movable member of a machine tool or a robot. The acceleration and deceleration system has a linear acceleration and deceleration circuit (3) for receiving interpolation data issued from a pulse distributor (5) and effecting a linear acceleration and deceleration computation on the received data, and an exponential acceleration and deceleration circuit (4) for receiving an output signal from the linear acceleration and deceleration circuit (3) and effecting an exponential acceleration and deceleration computation on the output signal, the circuits (3), (4) being connected in series with each other. The exponential acceleration and deceleration circuit (4) reduces abrupt changes of the controlled speed which are a drawback of the linear acceleration and deceleration circuit (3) prevent shocks from being produced when an axis starts moving and is decelerated thereby providing smooth and accurate acceleration and deceleration control.

4 Claims, 7 Drawing Figures

ACCELERATION AND DECELERATION CONTROL SYSTEM

BACKGROUND OF THE INVENTION

Field of the Invention

The present invention relates to an acceleration and deceleration system, and more particularly to an acceleration and deceleration system for an electric motor employed to drive a movable member of a machine tool, a robot hand, or the like.

Description of the Related Art

Movable members of machine tools, robot hands, and the like are generally driven by electric motors such as servomotors. When driving a movable member of a machine tool or moving a robot hand, the electric motor is preferably accelerated or decelerated so as not to apply a shock or vibration to the mechanical system at the time the motor starts to rotate or is stopped. As one acceleration and deceleration system, there is known a system for exponentially increasing or decreasing the rate f of pulses controlling the servometer, as shown in FIG. 5.

In such an exponential acceleration and deceleration system, the acceleration and deceleration control may be carried out entirely irrespective of interpolation of commanded feed speed and displacement, and if interpolation is started, acceleration is caused, whereas if interpolation is finished, deceleration results. The exponential acceleration and deceleration system is advantageous in that the interpolator and acceleration and deceleration circuit are simple in arrangement. Since, however, this system involves an inherent lag upon acceleration and deceleration, the lags of the axes cannot be equalized in circular interpolation under two-axis control, resulting in a disadvantage in that the path which results from exponential acceleration and deceleration is subjected to an error.

To eliminate this error, there has been proposed an acceleration and deceleration system for reducing the path error in circular interpolation by effecting linear acceleration and deceleration as shown in FIG. 3 using a given time constant (see Japanese Patent Application No. 57-172863, for example).

However, as is apparent from FIG. 3, the linear acceleration and deceleration system has the problem that the controlled speed is not smooth and is subject to abrupt changes as compared with the exponential acceleration and deceleration control, and the mechanical system suffers shocks or vibration as the speed goes through the abrupt changes when an axis starts moving or is decelerated.

SUMMARY OF THE INVENTION

The present invention has been made in an effort to solve the above problems. It is an object of the present invention to provide an acceleration and deceleration system capable of smoothly and accurately driving a mechanical system.

According to the present invention, there is provided an acceleration and deceleration system for progressively increasing a feed speed up to a command speed and progressively reducing the feed speed, comprising a linear acceleration and deceleration circuit for receiving data based on a feed speed signal and a displacement signal and effecting a linear acceleration and deceleration computation on the received signals, and an exponential acceleration and deceleration circuit for receiving an output signal from the linear acceleration and deceleration circuit and effecting an exponential acceleration and deceleration computation on the received signal.

According to the acceleration and deceleration system of the invention, abrupt changes in the controlled speed which are the disadvantage of the linear acceleration and deceleration circuit are reduced by the exponential acceleration and deceleration circuit to prevent shocks from being produced when an axis starts moving and is decelerated and to perform smooth and accurate acceleration and deceleration control.

DESCRIPTION OF THE PREFERRED EMBODIMENT

Figure 1:
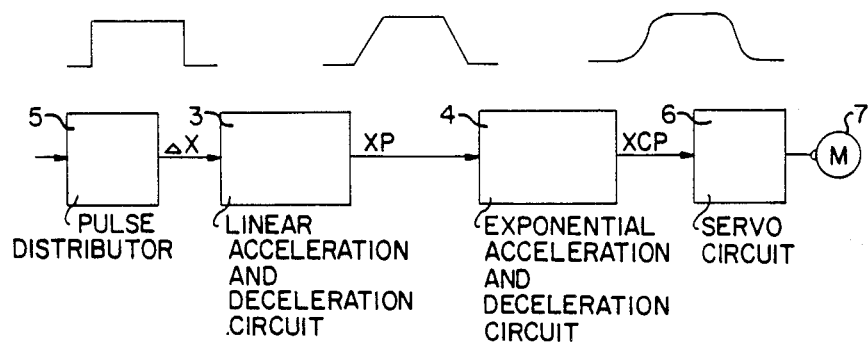
FIG. 1 is a block diagram of an acceleration and deceleration control system according to the present invention.

The present invention will hereinafter be described in specific detail with reference to an embodiment illustrated in FIG. 1. FIG. 1 is a block diagram of an acceleration and deceleration circuit in an acceleration and deceleration system according to the present invention. Denoted at 3 is a linear acceleration and deceleration circuit, and 4 an exponential acceleration and deceleration circuit. According to the present invention, the linear acceleration and deceleration circuit 3 is followed by and connected in series with the exponential acceleration and deceleration circuit 4. A pulse distributor 5 in a servo system, for example issuing a signal as a speed command, is connected to the input terminal of the linear acceleration and deceleration circuit 3, and the output terminal of the exponential acceleration and deceleration circuit 4 is connected to a servo circuit 6. A servo-motor 7 is controlled by the servo circuit 6.

Figure 2:
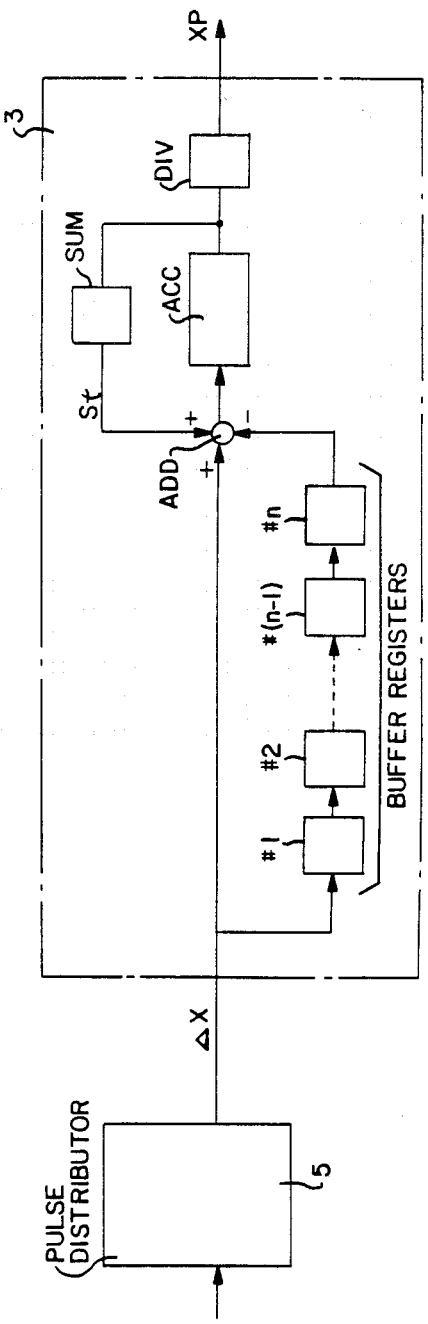
FIG. 2 is a block diagram of a linear acceleration and deceleration circuit.

As shown in FIG. 2, the linear acceleration and deceleration circuit 3 is supplied with a signal $\Delta X$ as a speed command produced from the pulse distributor 5. The linear acceleration and deceleration circuit 3 has n (n is equal to $\tau L/T$ where $\tau L$ is a time constant and T is a sampling time) buffer registers #1, #2, ... #(n−1), #n, an adder ADD, an accumulator ACC for temporarily storing the sum from the adder ADD, a register SUM for transferring the sum, and a divider DIV for dividing the sum by n. The buffer registers #1 through #n are connected in series. In each sampling cycle, the latest interpolation data $\Delta X$ is stored in the buffer register #1, and the content of each buffer register is transferred to a next buffer register, while the content $\Delta Xo$ of the final buffer register #n is applied to the adder ADD.

Figure 3:
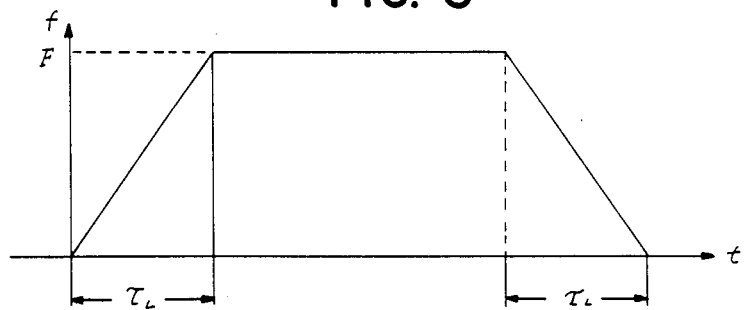
FIG. 3 is a diagram showing operating characteristics of the linear acceleration and deceleration circuit.

At a certain sampling time, the adder ADD effects the computation:

$$\Delta X_n - \Delta X_o + St \rightarrow St$$

where St is the content of the register SUM, and the result St is stored in the accumulator ACC. The content of the accumulator ACC is divided in the divider DIV by n, and the quotient is issued as pulses XP. At the same time, the content of each buffer register #1 through #n is shifted to a next buffer register, $\Delta X_n$ is stored in the first buffer register #1, and the content St of the accumulator ACC is transferred to the register SUM. The linear acceleration and deceleration circuit 3 itself has acceleration and deceleration operation characteristics as shown in FIG. 3.

Figure 4:
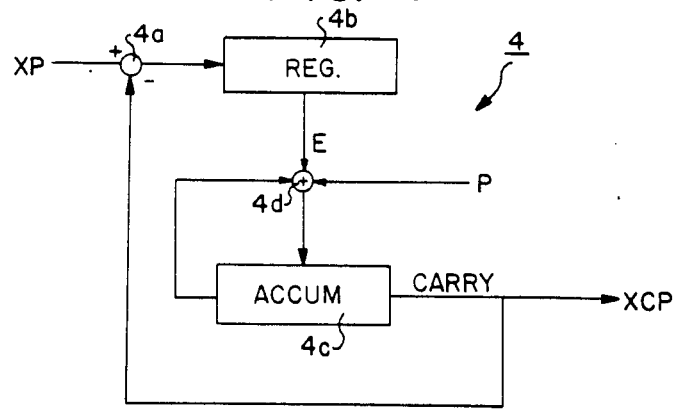
FIG. 4 is a block diagram of an exponential acceleration and deceleration circuit.

As illustrated in FIG. 4, the exponential acceleration and deceleration circuit 4 includes a combination circuit 4a for combining pulses XP produced from the linear acceleration and deceleration circuit 3 and output pulses XCP from the exponential acceleration and deceleration circuit 4 itself. Also included are a register 4b for accumulating pulses issued from the combination circuit 4a, an accumulator 4c, and an adder 4d. The adder 4d adds the content E of the register 4b and the content of the accumulator 4c each time a pulse P of a fixed rate Fc is generated and stores the sum in the accumulator 4c.

The operation of the exponential acceleration and deceleration circuit 4 will now be described. Assuming that the rate of pulses XP applied to the exponential acceleration and deceleration circuit 4 is F and the rate of output pulses XCP therefrom is Fo, the following equations are established:

$$dE/dt = F - Fo \qquad (1)$$

$$Fo = (Fc/2^n) \cdot E \qquad (2)$$

Figure 5:
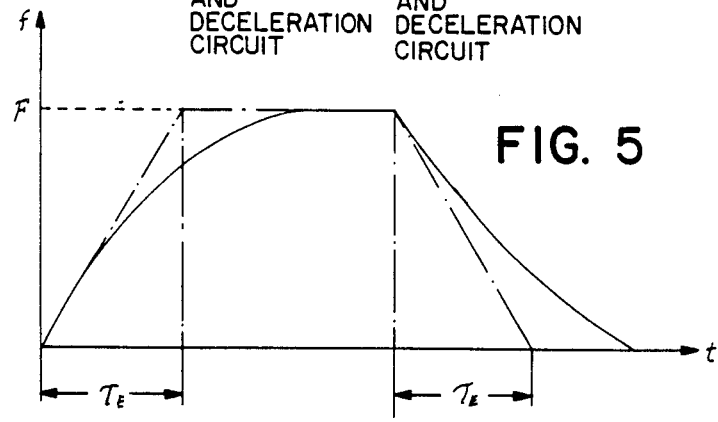
FIG. 5 is a diagram showing operating characteristics of the exponential acceleration and deceleration circuit.

The number of bits in the accumulator 4 is n. The equation (1) is indicative of an increment per unit time in the register 4b, and the equation (2) is representative of the number of carry pulses (output pulses XCP) issued per unit time from the accumulator 4c. From these equations (1), (2), the pulse speed Fo is determined by:

$$Fo = F[1 - \exp(-Kt)] \qquad (3)$$

where K is a constant. The output pulse speed Fo asymptotically approaches the pulse speed F as shown in FIG. 5. Whent he time constant is $\tau E$, the constant K is equal to 1/96 E, where $t = FC/2^n$.

The output terminal of the exponential acceleration and deceleration circuit 4 is connected to the servo circuit 6 to apply the output pulses XCP to the servo circuit 6. The servo circuit 6 is responsive to the output pulses XCP from the exponential acceleration and deceleration circuit 4 to drive the servomotor 7.

Figure 6:
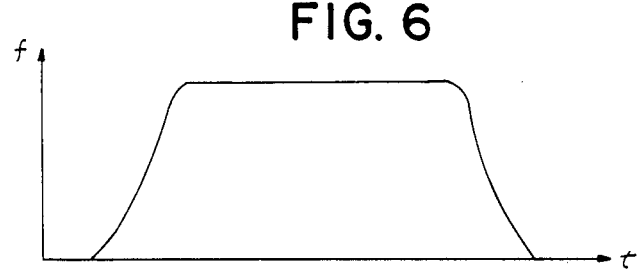
FIG. 6 is a diagram illustrative of operating characteristics of the acceleration and deceleration system of the present invention.

The operation of the acceleration and deceleration system shown in FIG. 1 will now be described in more detail. Pulses based on data in each sampling cycle, which are issued from the pulse distributor 5, are applied to the linear acceleration and deceleration circuit 3, which then effects the linear acceleration and deceleration control as shown in FIG. 3. The output pulse which is subjected to the linear acceleration and deceleration control is applied to the exponential acceleration and deceleration circuit 4. As shown in FIG. 6, the varying rate of the exponential acceleration and deceleration circuit 4 upon acceleration and deceleration is not abruptly changed. Therefore, as illustrated in FIG. 6, the acceleration and deceleration characteristics of the pulse XCP issued from the exponential acceleration and deceleration circuit 4 are controlled so that the angular corners of the pulse shape are rounded.

The acceleration and deceleration system according to the present invention can shorten a positioning time by selecting the time constant $\tau E$ of the exponential acceleration and deceleration circuit 4 to be small as compared with the time constant $\tau L$ of the linear acceleration and deceleration circuit 3.

Figure 7:
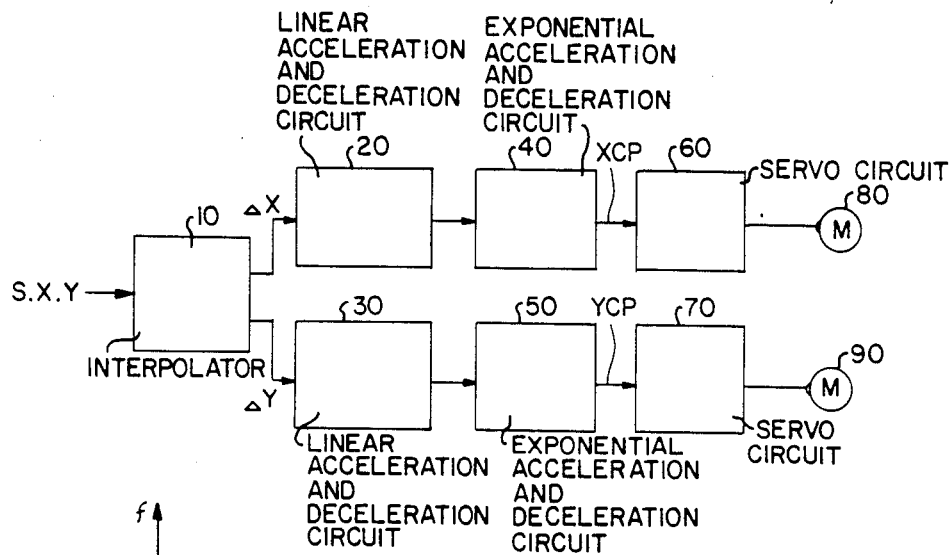
FIG. 7 is a block diagram of an embodiment in which the present invention is applied to a two-axis control servo circuit.

An embodiment in which the present invention is applied to an X-Y-axis, or two-axis speed control circuit in a numerical control apparatus will be described below. Designated at 10 in FIG. 10 in FIG. 7 is an interpolator for displacement components $\Delta X$, $\Delta Y$ in the directions of the X- and Y-axes by using a feed speed S indicated by a control signal from the numerical control apparatus (not shown), a displacement X along the X-axis, and a displacement Y along the Y-axis. The interpolation data signals $\Delta X$, $\Delta Y$ are applied respectively to an X-axis linear acceleration and deceleration circuit 20 and a Y-axis linear acceleration and deceleration circuit 30. The linear acceleration and deceleration circuits 20, 30 are identical to the linear acceleration and deceleration circuit 3 shown in FIG. 3, and operate in the same manner. Denoted at 40, 50 are exponential acceleration and deceleration circuits which are identical to the exponential acceleration and deceleration circuit 4 shown in FIG. 4 and operate in the exponential acceleration and deceleration circuits 40, 50 are applied respectively to X- and Y-axis servo circuits 60, 70, which control servo motors 80, 90, respectively, based on the applied command signals in the form of the output pulses XCP, YCP. The speed command signals comprising the pulses $\Delta X$, $\Delta Y$ issued from the interpolator 10 for the X- and Y-axis directions are controlled to have substantially the same acceleration and deceleration characteristics as shown in FIG. 3. Pulses XP, YP produced from the linear acceleration and deceleration circuits 20, 30 are applied to the exponential acceleration and deceleration circuits 40, 50. The exponential acceleration and deceleration circuits 40, 50 operate to only round angular portions of the acceleration and deceleration characteristics so that the acceleration and deceleration characteristics will not be abruptly changed when the servomotors 80, 90 are accelerated and decelerated. In this embodiment, where circular interpolation is effected by two-axis control, errors in circular interpolation which are a drawback of the exponential acceleration and deceleration control system are prevented from occuring, and shocks which are a shortcoming of the linear acceleration and deceleration control system are prevented from being caused when movement along an axis is started and decelerated, with the consequence that smooth and accurate acceleration and deceleration control can be carried out.

Although two embodiments have been shown and described, it should be understood that the present invention is not limited to the above embodiments, but many changes and modifications may be made therein without departing from the scope of the invention.

According to the present invention, as described above, acceleration and deceleration control of an electric motor can be smoothly performed, and the motor can be driven without imposing shocks and vibration to a mechanical system. The present invention is preferably used in acceleration and deceleration control of electric motors for use in machine tools controlled by numerical control apparatus and robots.

We claim:

1. An acceleration and deceleration system for progressively increasing a feed speed up to a command speed and for progressively reducing the feed speed, comprising:

a linear acceleration and deceleration circuit operatively connected to receive input data representing a feed speed and a displacement, for effecting a linear acceleration and deceleration computation on the input data to produce an output signal; and an exponential acceleration and deceleration circuit, operatively connected to receive the output signal from said linear acceleration and deceleration circuit, for effecting an exponential acceleration and deceleration computation on the output signal to produce a speed command signal.

2. An acceleration/deceleration system for at least one of increasing a feed speed up to a command speed and reducing the feed speed in dependence upon feed speed and displacement signals, comprising:

an interpolator, operatively connected to receive the feed speed and displacement signals, for computing and issuing interpolation data on a plurality of axes in dependence upon the feed signal and the displacement signal;

a linear acceleration and deceleration circuit, operatively connected to receive the interpolation data issued from said interpolator on each axis per one sampling cycle, for effecting a linear acceleration and deceleration computation on the received data to produce an output signal; and an exponential acceleration and deceleration circuit, operatively connected to receive the output signal from said linear acceleration and deceleration circuit, for effecting an exponential acceleration and deceleration computation on the output signal separately for each axis.

3. An acceleration and deceleration system as recited in claim 1, wherein said linear acceleration and deceleration circuit comprises:

a predetermined number of buffer registers, operatively connected to receive the input data, for producing a buffered signal;

a first adder, operatively connected to the buffer registers and to receive the input data, for subtracting the buffered signal from the input data to produce a first calculated signal;

an accumulator, operatively connected to said first adder, for storing the first calculated signal;

a sum register, operatively connected to said accumulator and said first adder, for storing the first calculated signal and supplying the first calculated signal to said first adder, said first adder adding a previously generated first calculated signal to subsequently generated input data and buffer signals to produce a subsequent first calculated signal; and a divider, operatively connected to said accumulator, for dividing the first calculated signal by the predetermined number to produce a second calculated signal, and wherein said exponential acceleration and deceleration circuit comprises:

a combination circuit, operatively connected to said divider, for subtracting the speed command signal from the second calculated signal to produce a combined signal;

a combined signal register, operatively connected to said combination circuit, for storing the combined signal;

a second adder operatively connected to said combined signal register for accumulating the combined signal in dependence upon pulses received at a fixed rate to produce a combined signal sum; and an accumulator, operatively connected to said second adder, for storing the combined signal sum and producing the speed command signal in dependence upon a carry generated by accumulating the combined signal, said accumulator having a number of bits equal to the predetermined number of said buffer registers.

4. An acceleration and deceleration system as recited in claim 2, wherein said linear acceleration and deceleration circuit comprises:

a predetermined number of buffer registers, operatively connected to receive the input data, for producing a buffered signal;

a first adder, operatively connected to the buffer registers and to receive the input data, for subtracting the buffered signal from the input data to produce a first calculated signal;

an accumulator, operatively connected to said first adder, for storing the first calculated signal;

a sum register, operatively connected to said accumulator and said first adder, for storing the first calculated signal and supplying the first calculated signal to said first adder, said first adder adding a previously generated first calculated signal to subsequently generated input data and buffer signals to produce a subsequent first calculated signal; and a divider, operatively connected to said accumulator, for dividing the first calculated signal by the predetermined number to produce a second calculated signal, and wherein said exponential acceleration and deceleration circuit comprises:

a combination circuit, operatively connected to said divider, for subtracting the speed command signal from the second calculated signal to produce a combined signal;

a combined signal register, operatively connected to said combination circuit, for storing the combined signal;

a second adder operatively connected to said combined signal register for accumulating the combined signal in dependence upon pulses received at a fixed rate to produce a combined signal sum; and an accumulator, operatively connected to said second adder, for storing the combined signal sum and producing the speed command signal in dependence upon a carry generated by accumulating the combined signal, said accumulator having a number of bits equal to the predetermined number of said buffer registers.

* * * * *

UNITED STATES PATENT AND TRADEMARK OFFICE
CERTIFICATE OF CORRECTION

PATENT NO. : 4,706,003
DATED : November 10, 1987
INVENTOR(S) : Nakashima et al.

It is certified that error appears in the above-identified patent and that said Letters Patent is hereby corrected as shown below:

Col. 3, line 51, "1/96 E, where $t=FC/2^n$" should be --$1/\tau E$, where $\tau=Fc/2^n$--.

Col. 4, line 16, delete "in Fig. 10".

Col. 4, line 31, after "the" insert --same manner. Output pulses XCP, YCP issued from the--.

Signed and Sealed this

Twenty-fourth Day of May, 1988

Attest:

DONALD J. QUIGG

Attesting Officer

Commissioner of Patents and Trademarks